United States Patent

[11] 3,582,107

| [72] | Inventors | George W. Goetz<br>Detroit;<br>Robert N. Roley, Birmingham, both of, Mich. |
|---|---|---|
| [21] | Appl. No. | 717,662 |
| [22] | Filed | Apr. 1, 1968 |
| [45] | Patented | June 1, 1971 |
| [73] | Assignee | Eaton Yale & Towne Inc.<br>Cleveland, Ohio |

[54] INFLATABLE VEHICLE CONFINEMENT
16 Claims, 9 Drawing Figs.

[52] U.S. Cl. .................................................. 280/150
[51] Int. Cl. ................................................. B60r 21/08
[50] Field of Search ........................................ 280/150,
(Cursory); 206/1 (Inflat. Digest); 244/122, 121

[56] References Cited
UNITED STATES PATENTS

| 2,462,215 | 2/1949 | Norman et al. | 206/1UX |
| 2,859,048 | 11/1958 | Munn | 280/150UX |
| 3,192,540 | 7/1965 | Swank | 244/122X |
| 3,414,292 | 12/1968 | Oldberg et al. | 280/150 |
| 3,430,979 | 3/1969 | Terry et al. | 380/150 |
| 3,451,694 | 6/1969 | Hass | 280/150 |

FOREIGN PATENTS

| 953,312 | 3/1964 | Great Britain | 280/150 |

*Primary Examiner*—Kenneth H. Betts
*Attorney*—Yount, Flynn & Tarolli

ABSTRACT: A vehicle safety apparatus includes an inflatable confinement which is inflated by the flow of fluid from a fluid reservoir to the confinement. The confinement has a generally cylindrical shape and is constructed to receive and locate the fluid reservoir therein. The confinement is compartmentalized in certain embodiments. The compartmentalized confinement is operable to restrain movement of a plurality of vehicle passengers during a collision. The compartmentalized construction provides a restraint for each passenger and operates to control each passenger substantially independently of any other passengers during a collision. In another embodiment of the present invention, a plurality of compartmentalized confinements are utilized to control movement of the occupant of the vehicle during a collision.

PATENTED JUN 1 1971 3,582,107

INVENTORS
GEORGE W. GOETZ
ROBERT N. ROLEY
BY
Yount, Flynn, & Tarolli
ATTORNEYS

INVENTORS
GEORGE W. GOETZ
ROBERT N. ROLEY
BY
*Yount, Flynn & Tarolli*
ATTORNEYS

INFLATABLE VEHICLE CONFINEMENT

The present invention relates to a vehicle safety apparatus, and particularly relates to a vehicle safety apparatus which includes a confinement which controls and restrains the movement of a vehicle passenger during a collision and which has a contracted inoperative condition and an expanded operative condition and which is actuated to its expanded condition by the flow of fluid to the confinement.

Inflatable confinements for controlling the movement of an occupant of a vehicle during a collision are known. Such a confinement protects the occupant of the vehicle during a collision. Often the passengers in an automotive vehicle are of different size and weight and this creates some problems in providing a confinement which will control those passengers when the passengers may be sitting immediately adjacent one another in the vehicle at the time of the collision. It is desirable to provide an inflatable confinement which will control the movement of such passengers individually during a collision, even though the weight and size of the passengers may be different.

The principal object of the present invention is the provision of a new and improved vehicle safety apparatus which includes a confinement which is expanded to an operative position to control or restrain the movement of an occupant of a vehicle during a collision and wherein the confinement is of a practical construction, is reliable in operation, and may be readily manufactured at a reasonable cost.

A further object of the present invention is the provision of a new and improved vehicle safety apparatus which includes an inflatable confinement which is operable to control or restrain movement of a plurality of passengers in an automotive vehicle during a collision and wherein the confinement is constructed so that each passenger is individually controlled by the confinement substantially independently of the other passengers so that the weight and size of a particular passenger does not adversely affect the control which the confinement places on any other passenger.

A still further object of the present invention is the provision of a new and improved vehicle safety apparatus which is adapted to control and restrain movement of a plurality of passengers during a collision and which has a compartmentalized construction so that each individual passenger is restrained in the main by a compartment of the confinement so that the weight and size of the individual passenger does not substantially affect the operation of the confinement on the adjacent passenger.

Another object of the present invention is the provision of a new and improved vehicle safety apparatus, as noted in the next preceding paragraph, wherein a single fluid reservoir extends through the confinement and provides for inflation of all of the compartments of the confinement.

Still another object of the present invention is the provision of a new and improved vehicle safety apparatus which includes a confinement having a contracted inoperative position and an expanded operative position and wherein the confinement is of a simple inexpensive construction which provides the confinement with a generally cylindrical shape when expanded.

Yet another object of the present invention is the provision of a new and improved vehicle safety apparatus, as noted in the next preceding paragraph, wherein the confinement has portions which receive the fluid reservoir and locate the fluid reservoir therein.

Still a further object of the present invention is the provision of a new and improved vehicle safety apparatus wherein the longitudinal axis of the cylindrical-shaped confinement and the axis of the reservoir extend substantially parallel to the vehicle seat on which the passenger or passengers to be restrained by the confinement sit.

A still further object of the present invention is the provision of a new and improved vehicle safety apparatus which includes a confinement having a contracted inoperative position and an expanded operative position, and wherein the confinement is adapted to be mounted in association with the steering wheel of the vehicle and has a generally cylindrical shape when expanded.

A further object of the present invention is the provision of a new and improved vehicle safety apparatus including a plurality of confinements which are actuated to their operative condition in sequence by the flow of fluid into the confinements to control the occupant by the sequential actuation thereof.

Further objects and advantages of the present invention will be apparent to those skilled in the art to which it relates from the following detailed description of preferred embodiments thereof made with reference to the accompanying drawing forming a part of this specification and in which.

The present invention provides an improved vehicle safety apparatus. The vehicle safety apparatus of the present invention includes an inflatable confinement having an inoperative collapsed condition and an operative expanded condition. The confinement is expanded by the flow of fluid into the confinement. The confinement is used to control or restrain the movement of an occupant or occupants of a vehicle during a collision, and thus protects the occupant or occupants of the vehicle from forceful impact with a structural part of the vehicle during the collision. The vehicle safety apparatus embodying the present invention may be utilized in vehicles of different types, such as automobiles, airplanes, and trucks.

As representing the preferred embodiment of the present invention, a vehicle safety apparatus 10 is illustrated as being applied to an automotive vehicle 11. The vehicle safety apparatus 10 may be associated with different parts of the automotive vehicle and may be mounted in the back of the front seat or in various locations in the automotive vehicle. As illustrated, the vehicle safety apparatus 10 is located in association with the dashboard 12 of the vehicle 11.

Figure 1:
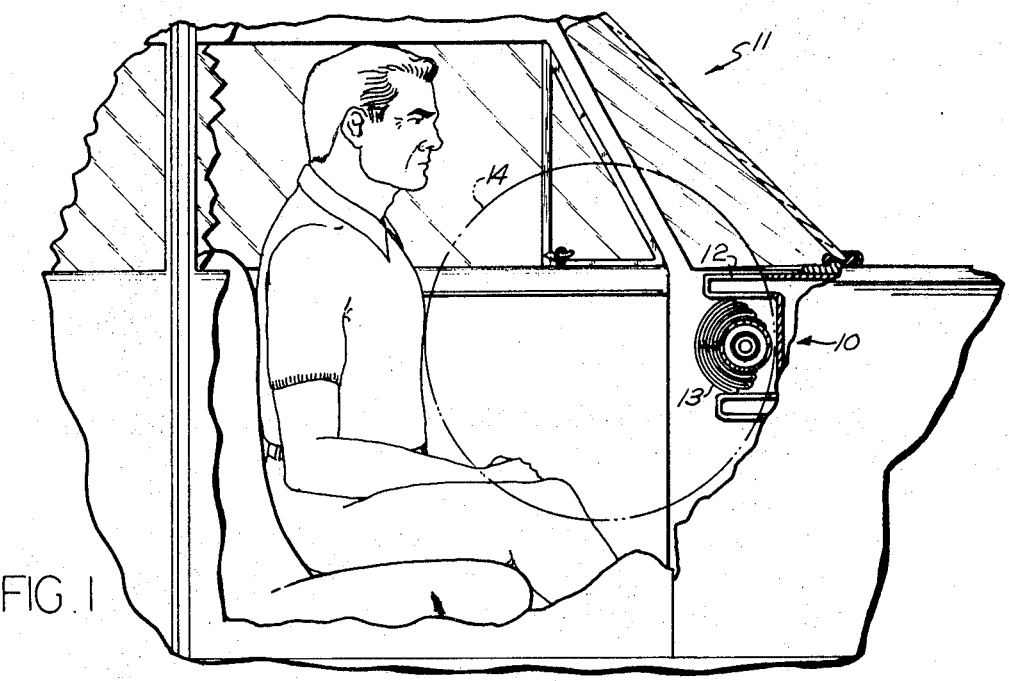
FIG. 1 is a schematic fragmentary view illustrating a portion of a vehicle embodying the present invention.
Figure 2:
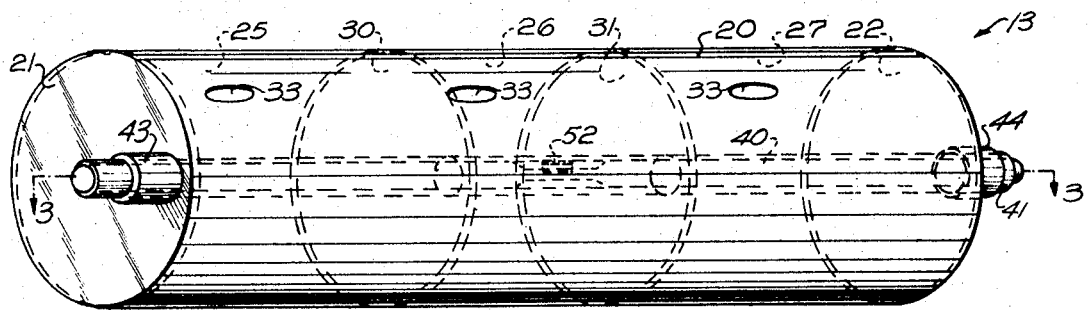
FIG. 2 is a view of a safety apparatus embodied in the vehicle of FIG. 1 and showing the safety apparatus in an operative condition.

The vehicle safety apparatus 10 includes a confinement 13 which has a contracted inoperative position, as shown in full lines in FIG. 1, and also has an expanded operative condition, shown by the dash line designated 14 in FIG. 1. The confinement 13 when expanded to its operative condition controls and restrains movement of an occupant or occupants of the vehicle relative to the vehicle during a collision. The confinement 13 when inflated has a generally cylindrical shape, as shown in FIG. 2, with the axis of the inflated confinement extending generally parallel to the dashboard of the vehicle and to the front seat of the vehicle in which the passengers sit. The confinement has an extent which is substantially equal to the distance between the steering wheel of the vehicle and the door on the passenger's side of the vehicle so as to have an extent when inflated approximately equal to the extent of the front seat of the vehicle between the steering wheel and the door of the vehicle. In view of this size, the confinement 13 will operate to restrain the movement of a plurality of passengers located in the front seat of the vehicle.

The confinement 13 is constructed so as to provide a restraint for the individual passengers sitting in the front seat of the vehicle. It should be apparent, of course, that a plurality of passengers may be sitting in the front seat of the automotive vehicle and in such a case, the confinement is constructed so as to individually handle each of the passengers without regard to the size and weight of the adjacent passenger. To this end, the confinement is compartmentalized and specifically is divided into a plurality of compartments or chambers, designated 25, 26 and 27. The compartments 25, 26 and 27 are defined by the end walls 21, 33 and by divider members 30, 31 which are suitably secured, such as by sewing, to the portion 20 of the confinement. As shown in the drawings, the compartment 25 is defined by the wall portion 21 and the divider 30. The compartment 26 is defined by the divider 30 and the divider 31, and the compartment 27 is defined by the divider 31 and the end wall 22. The axial extent of each compartment may vary depending on the size of the vehicle in which the confinement 13 is utilized.

Each of the compartments 25, 26, 27 is sealed against fluid communication with the other compartments. As a result, each compartment operates individually to control the movement of an occupant of the vehicle 11 relative to the vehicle 11. However, since the confinement 13 is an integral unit, a passenger is prevented from moving between portions of two confinements and striking a structural part of the vehicle, such as would result from the use of separate confinements.

As noted above, each of the compartments 25, 26, 27 acts independently of the other and controls or restrains the movement of an occupant of the vehicle 11 relative to the vehicle. In the event that an occupant of the vehicle 11 is located in the front seat of the vehicle so that upon a collision, the occupant engages the portion 20 of the confinement so as to overlap two of the compartments 25, 26, 27, the confinement 13 still operates to protect that particular individual. For example, if an individual is located in the front seat of the vehicle and engages the confinement 13 so as to overlap a part of the compartment 25 and a part of the compartment 26, the confinement 13 will still be operative to control the movement of that particular individual and the individual, of course, cannot move between the compartments 25, 26, such as would be the case if the compartments 25, 26 were separate confinements.

Moreover, since the compartments are sealed from each other, the individual control of plural passengers is provided. The control or restraint provided by each compartment is proportional to the pressure in the compartment. If an individual of substantial size and weight engages one compartment and causes an increase in pressure therein, such a pressure increase is not transmitted to adjacent compartments, which are located such that an individual of lesser age and weight, such as a child, might engage them. As a result, the child is controlled independently of other heavier individuals. Otherwise, the child might bounce off the confinement and be injured as a result.

Each of the compartments 25, 26, 27 may be provided with a so-called "blowout patch" 33 which blows out and provides an orifice for flow of fluid from the compartment when the pressure in the compartment reaches a predetermined level. The pressure in the compartment may reach that level by the flow of fluid into the compartment or when an occupant of the vehicle engages the compartment and increases the pressure therein due to the engagement. When the blowout patches are removed due to the increase in pressure, fluid in the various compartments flows outwardly thereof and the pressure in the compartments decreases. This, of course, provides not only for deflation of the compartments, but also provides for absorption of the energy of the occupant so as to minimize rebound of the occupant from the confinement, as described in copending application Ser. No. 621,846 filed Mar. 9, 1967 (now abandoned) assigned to the assignee of the present invention.

The various compartments 25, 26, 27 of the confinement 13 are inflated substantially simultaneously by flow of fluid from a fluid reservoir 40. The fluid reservoir 40 has a diffuser member 41 associated therewith. The diffuser member 41 and the fluid reservoir 40 extend through opposite end walls 21, 22 of the confinement 13, and a suitable collar portion 43, 44 of the confinement is provided extending from the end walls 20, 21, respectively, to provide a substantial fluid seal between the reservoir 40 and the interior of the confinement. The reservoir 40 and diffuser member 41 also extend through openings in dividers 30, 31 and a fluid seal is provided therebetween so as to seal each compartment from the others.

The diffuser member 41 and the reservoir 40 define a fluid chamber 50 therebetween into which fluid flows from the reservoir 40 when the reservoir 40 is opened. The reservoir 40 is opened to provide for fluid flow into the chamber 50 by explosive means 52. The explosive means 52 is ignited in any suitable manner upon the vehicle encountering a collision condition and when ignited an opening is formed in the reservoir 40 and fluid flows from the opening into the chamber 50. As fluid flows from the opening into the chamber 50, it is directed generally axially of the reservoir or along the longitudinal extent of the reservoir 40 by the diffuser member 41. The diffuser member 41 is provided with a plurality of slots or passages 53 which communicate with the chamber 50 and each of which communicate with one of the various compartments 25, 26, 27 so as to provide for fluid flow from the chamber 50 into the compartments. The flow of fluid into the various compartments is substantially simultaneous and, thus, the various compartments are inflated substantially simultaneously.

The flow of fluid into the compartments 25, 26, 27 results in a rapid inflation of the confinement 13. An occupant or occupants of the vehicle are thus protected from a forceful impact with a structural part of the vehicle as a result of the collision. Movement of the occupants or occupant is restrained by the confinement and while some movement does occur, it is controlled by the confinement 13. Since compartments 25, 26, 27 operate substantially independently, a plurality of passengers or occupants may be restrained substantially independently, as described above.

Figure 3:
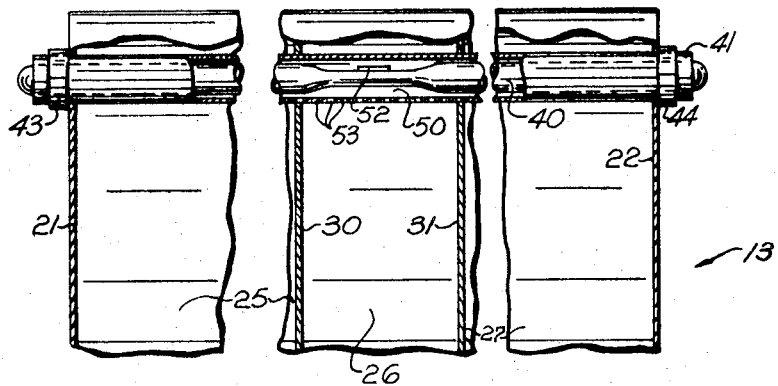
FIG. 3 is a cross-sectional view taken approximately along the section line 3–3 of FIG. 2.
Figure 4:
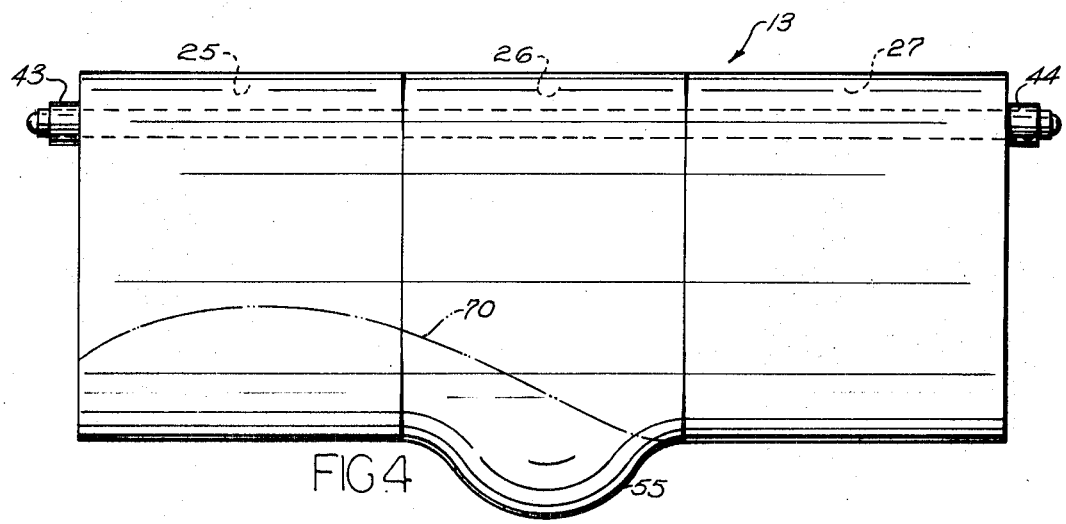
FIG. 4 is a schematic plan view of a modified embodiment of the present invention.

The embodiment of the present invention illustrated in FIG. 4 is similar to the embodiment shown in FIGS. 1—3 and similar reference numerals will be utilized to indicate corresponding parts. The confinement 13 illustrated in FIG. 4 differs from the confinement 13 shown in FIGS. 2 and 3 only by the provision of an extra amount of material 55 in the central portion of the confinement so as to provide the compartment 26 with a larger size than the two adjacent compartments 25 and 27, respectively. The extra material 55 permits a substantial amount of movement of one portion of the confinement, such as the portion which defines the compartment 25, without a corresponding substantial amount of movement of the portion of the confinement 13 defining the compartment 27, and in fact with a minimum amount of lateral pulling on the portion of the confinement 13 defining the compartment 27. In effect, as shown in the dotted line designated 70 in FIG. 4, a portion of the confinement 13 may be deformed substantially with a minimum of deformation or change in position of other portions of the confinement 13. For example, a very heavy individual of substantial size may engage the confinement 13 at the compartment 25 and cause a substantial deflation or deformation of the confinement 13 thereat, and still the portion of the confinement defining compartment 27 is maintained in substantially its original position without substantial change and therefore would provide a protection for restraining movement of an occupant who may not have come into engagement with the confinement 13. Moreover, due to the compartmented construction of the confinement the compartment 27 will not have a pressure therein which has changed due to the size of the individual who may have engaged the confinement.

Figure 5:
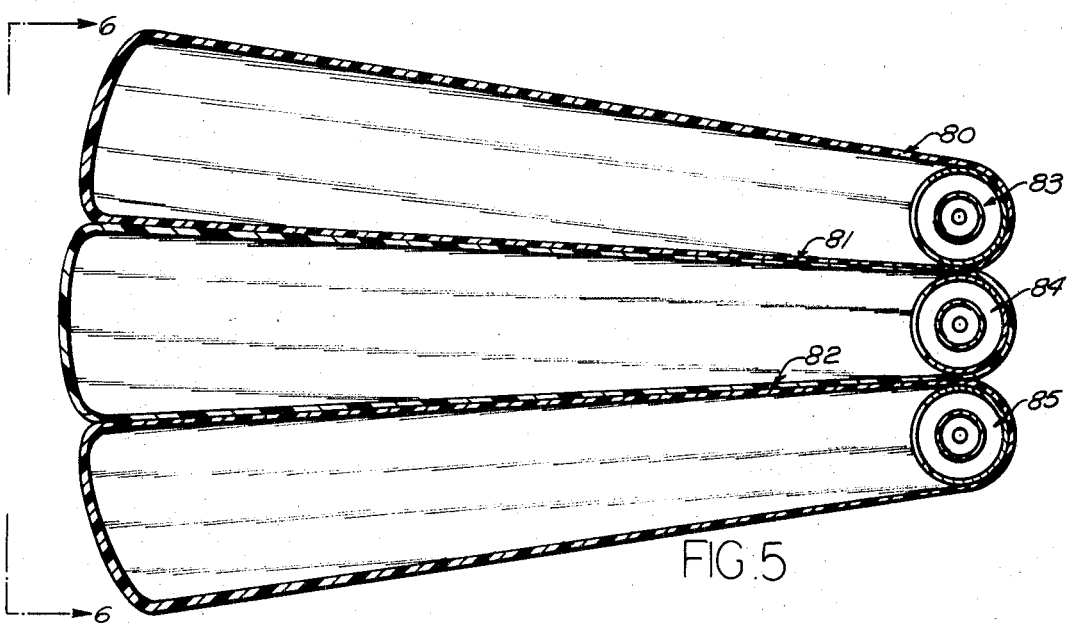
FIG. 5 is a schematic view of a still further embodiment of the present invention.
Figure 6:
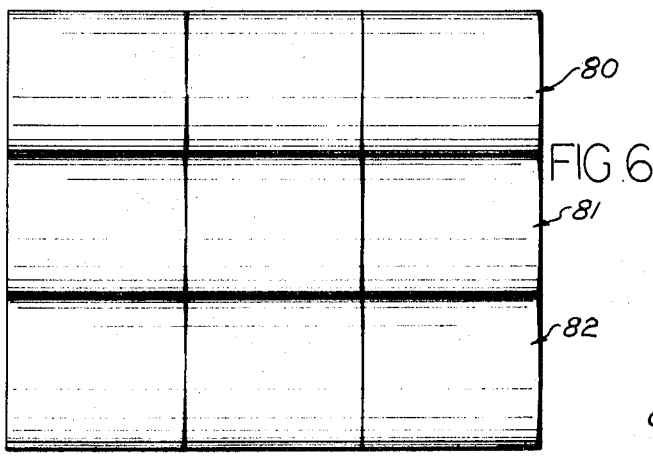
FIG. 6 is a view taken approximately along the line 6–6 of FIG. 5.

FIGS. 5 and 6 illustrate a still further modification of the present invention. In the modification of FIGS. 5 and 6, a plurality of compartmented confinements 80, 81, 82 are utilized. Each of the confinements 80, 81, 82 is compartmentalized so as to provide spaced compartments along the seat of the vehicle. Each confinement 80, 81, 82 also has its own individual fluid reservoir and diffuser member, which are shown schematically and generally designated 83, 84 and 85, respectively. A single reservoir and diffuser member for all of the confinements also could be utilized.

Figure 9:
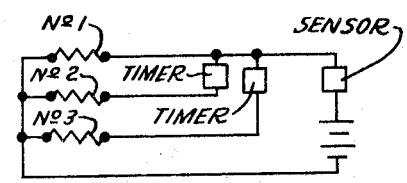
FIG. 9 is a schematic circuit for use in the embodiment of FIG. 5.

By providing a plurality of compartmentalized confinements 80, 81, 82, as shown in FIGS. 5 and 6, the confinements may be actuated in sequence so as to provide an effective control for occupants of the vehicle. In particular, the arrangement provides substantial protection for an unrestrained child or other vehicle occupant who may be leaning forward in the vehicle at the time of a collision. By first expanding the lower confinement 82, the confinement 82 is expanded outwardly prior to any expansion of the confinements 80, 81. The confinement 82 would thus engage the lower portion of the child or occupant and move him backwardly with respect to the vehicle and away from confinements 80, 81. Confinements 80, 81 would subsequently be energized, either in sequence or simultaneously, so as to further control the movement of the occupant by restraining forward movement of the occupant relative to the vehicle during the collision. The initial actuation of confinement 82 results in the occupant or occupants being moved away from confinements 80, 81 so that the confinements 80, 81 do not strike the occupant with the full force of their inflation. The confinements 80, 81, 82 are compartmentalized, as shown in FIG. 6, and control the movement of individual passengers on an individual basis independent of the weight and size of the passengers in much the same manner as described above in connection with the confinements illustrated in FIGS. 3 and 4. In addition the confinements 80, 81, 82 provide some degree of safety for the unrestrained child who may be located forwardly in the vehicle, as described above. FIG. 9 illustrates a circuit for use in sequentially activating the confinements 80, 81, 82 which are illustrated in FIG. 5. The circuit includes a sensor which is connected with a battery and which, when tripped, energizes an explosive, indicated No. 1, for activating the fluid flow from one of the fluid reservoirs and diffuser members 83, 84 and 85. Also, when the sensor is activated, the sensor actuates two timers, one of which is in a circuit with an explosive No. 2 and the other of which is in a circuit with an explosive No. 3. When the timers actuate, the timers activate explosives No. 2 and No. 3, to effect the flow of fluid from the diffuser and reservoirs which are associated with the other of the confinements. The timers illustrated are set for actuation at timed intervals. Accordingly, the circuit provides for sequential activation of the various confinements.

Figure 7:
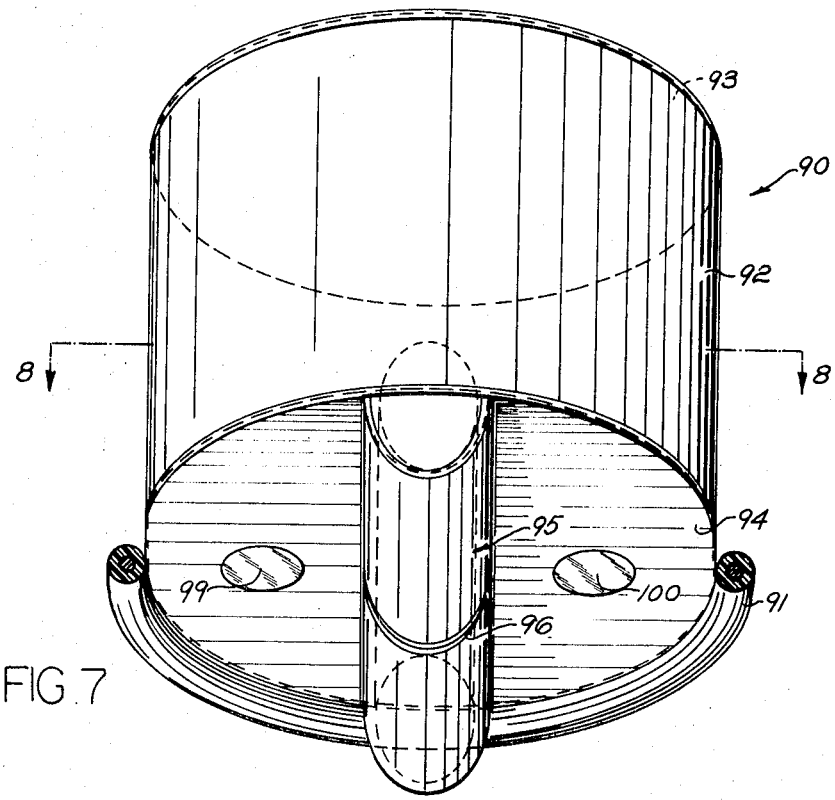
FIG. 7 is a view of still another embodiment of the present invention.
Figure 8:
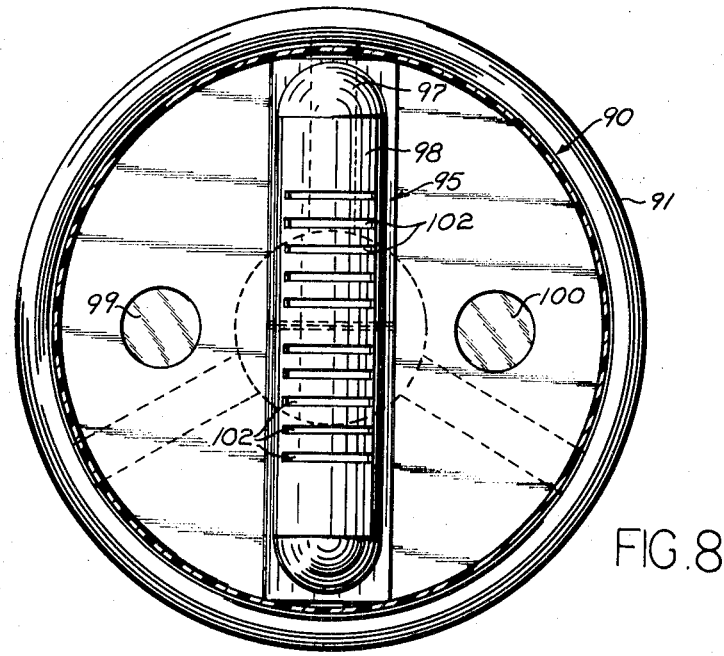
FIG. 8 is a sectional view taken approximately along section line 8–8 of FIG. 7.

The modification of the present invention illustrated in FIGS. 7 and 8 includes a confinement 90 which is adapted to be mounted in association with the steering wheel 91 of the vehicle. The confinement 90 when inflated has a generally cylindrical configuration with the axis of the confinement 90 extending substantially parallel to the steering column of the vehicle. The confinement 90 includes a cylindrical portion 92 and opposite end portions 93, 94. The end portion 93 when the confinement 90 is inflated projects outwardly toward the driver of the vehicle and is the portion of the confinement 90 which comes into contact with the driver of the vehicle. The end portion 94 of the confinement 90 has a projecting envelope 95 which extends downwardly therefrom. A slit 96 separates the envelope 95 into two parts. The envelope 95 receives the fluid reservoir 97 and diffuser member 98 which are supported in conjunction with the steering wheel 91 in a suitable manner, such as disclosed in application Ser. No. 674,810 filed Oct. 25, 1967 assigned to the assignee of the present invention. The slit 96 provides for access to the interior of the envelope and permits the insertion of the fluid reservoir 97 and the diffuser member 98 into the envelope 95. A pair of blowout patches 99, 100 are provided on the confinement 90 and operate in much the same manner as the blowout patches 33 described hereinabove.

When the vehicle encounters a collision condition, the fluid reservoir 97 is opened by suitable means to provide for fluid flow therefrom through slots 102 in the diffuser member 98 and into the interior of the confinement. The confinement 90 is expanded to the generally cylindrical shape, shown in FIG. 7, by the flow of fluid into the confinement 90. The confinement 90 provides a restraint for controlling the movement of the occupant of the vehicle during a collision, as described above in connection with the embodiment of FIGS. 1—3.

In view of the foregoing, it should be apparent that applicant has provided a new and improved vehicle safety apparatus and that certain changes, modifications, and adaptations may be made therein, and it is hereby intended to cover all such changes, modifications, and adaptations which come within the scope of the appended claims.

Having described my invention, I claim:

1. Apparatus comprising a confinement having a collapsed inoperative position and an inflated operative position, said confinement having an extent to control movement of a plurality of passengers in a vehicle during a collision, and said confinement having a plurality of separate adjacent compartments which provide for individual restraint of each passenger substantially independently of the adjacent passengers of the vehicle.

2. Apparatus as defined in claim 1 wherein a single fluid reservoir is provided for effecting inflation of said compartments.

3. Apparatus as defined in claim 1 wherein said confinement has a generally cylindrical configuration when in its inflated operative position.

4. Apparatus as defined in claim 3 wherein said cylindrical-shaped confinement is comprised of a pair of end members which are connected with a cylindrical-shaped portion so as to provide said cylindrical shape.

5. Apparatus as defined in claim 4 wherein said fluid reservoir is an elongate member which extends through said confinement and has its opposite end portions projecting through said end members.

6. Apparatus as defined in claim 4 wherein said confinement includes at least two compartments which are separated by a divider member.

7. A vehicle safety apparatus to be mounted in a position so as to effect a restraint on a plurality of passengers in a vehicle during a collision, said vehicle safety apparatus comprising an inflatable confinement having a collapsed inoperative condition and an inflated operative condition, said confinement having means defining a plurality of separate adjacent fluidtight compartments therein which provide a separate independent restraint for each occupant of the vehicle to restrain movement of that occupant of the vehicle independently of movement of any of the other occupants of the vehicle.

8. Apparatus as defined in claim 7 wherein one portion of said confinement is provided with an excess of material so as to provide for free movement of two adjacent parts of said confinement independently.

9. Apparatus as defined in claim 7 further including a fluid reservoir operatively associated with said confinement and a diffuser member for diffusing the flow of fluid from said reservoir prior to entry of the fluid into said confinement.

10. A vehicle safety apparatus comprising confinement means having a collapsed inoperative condition and an expanded operative condition, said confinement means comprising a plurality of separate adjacent fluidtight compartments providing for separate control of individual passengers by the confinement independently of other passengers of the vehicle, and means for inflating said confinement means.

11. Apparatus as defined in claim 10 wherein said confinement means comprises a single individual confinement having a plurality of compartments.

12. Apparatus as defined in claim 10 wherein said confinement means comprises a plurality of confinements each of which has a plurality of compartments and further including means for effecting individual actuation of said confinements to said expanded operative condition.

13. Vehicle safety apparatus comprising a plurality of confinements, each of said confinements having an inoperative contracted condition and an expanded operative condition, all of said confinements when in said operative condition being operable to restrain movement of at least one occupant of the vehicle during a collision, and means for inflating one of said confinements prior to the other of said confinements.

14. Vehicle safety apparatus as defined in claim 13 wherein said one confinement when expanded operates to move an occupant away from the other confinements prior to expansion thereof.

15. Vehicle safety apparatus as defined in claim 14 wherein each of said confinements has a plurality of separate compartments.

16. Vehicle safety apparatus comprising a confinement having a collapsed condition and an expanded condition, means comprising a fluid reservoir providing for fluid flow to effect expansion of said confinement, said confinement when expanded being operable to restrain movement of an occupant of a vehicle as a result of a collision, said confinement when expanded having a generally cylindrical configuration defined by a cylindrical portion and two end portions at opposite ends of the cylindrical portion, said fluid reservoir located in at least one of said end portions and said confinement includes means separating the confinement into a plurality of compartments.